US012566733B2

(12) United States Patent
Vinodkumar

(10) Patent No.: US 12,566,733 B2
(45) Date of Patent: Mar. 3, 2026

(54) HIERARCHICAL, TEMPORAL, AND POSITIONAL DATA STRUCTURE FOR GENERATIVE ARTIFICIAL INTELLIGENCE (AI)

(71) Applicant: HEWLETT PACKARD ENTERPRISE DEVELOPMENT LP, Spring, TX (US)

(72) Inventor: Ashish Vinodkumar, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/605,223

(22) Filed: Mar. 14, 2024

(65) Prior Publication Data

US 2025/0291768 A1      Sep. 18, 2025

(51) Int. Cl.
  *G06F 16/17*      (2019.01)
  *G06F 16/13*      (2019.01)
  *G06F 16/185*      (2019.01)
(52) U.S. Cl.
  CPC .......... *G06F 16/1734* (2019.01); *G06F 16/13* (2019.01); *G06F 16/185* (2019.01)
(58) Field of Classification Search
  CPC ..... G06F 16/1734; G06F 16/13; G06F 16/185
  USPC ........................................ 707/736, 741, 746
  See application file for complete search history.

(56) References Cited

U.S. PATENT DOCUMENTS

| | | | | |
|---|---|---|---|---|
| 8,695,104 B2 * | 4/2014 | Khosrowpour | ......... | G06F 21/78 |
| | | | | 713/165 |
| 2002/0112067 A1 * | 8/2002 | Chang | ..................... | H04L 45/62 |
| | | | | 709/232 |
| 2006/0136360 A1 * | 6/2006 | Gebhart | .............. | G06F 11/3476 |
| | | | | 707/999.001 |
| 2013/0138902 A1 * | 5/2013 | Haustein | ............... | G06F 3/0682 |
| | | | | 711/E12.103 |
| 2020/0019614 A1 * | 1/2020 | Kumar | ..................... | G06N 3/08 |
| 2022/0207050 A1 * | 6/2022 | Awadhwal | ........... | G06Q 10/103 |
| 2023/0017165 A1 * | 1/2023 | Walters | .................. | G06N 3/047 |
| 2024/0189994 A1 * | 6/2024 | P G | .......................... | B25J 9/161 |

OTHER PUBLICATIONS

"Chroma", available online at <https://www.trychroma.com/>, 2023, 7 pages.
"LangChain", available online at <https://www.langchain.com/>, retrieved from internet 189th Mar. 2024, 19 pages.

(Continued)

*Primary Examiner* — Phong H Nguyen
(74) *Attorney, Agent, or Firm* — Sheppard Mullin Richter & Hampton LLP

(57) ABSTRACT

Systems and methods are provided for generating metadata for an improved data structure that enables improvements to generative AI and LLM processing and use of the data. A system may receive a log file generated by an entity associated with a device and generate metadata of the log file that comprises origination data associated with the entity and location of the device. The system may store the metadata and content of the log file as a document object. A data structure may be generated using various data objects. For example, the system can generate a vector embedding object enriched with a temporal embedding, a positional embedding, or a hierarchy of the metadata. The system may initiate an action based on the vector embedding object.

20 Claims, 8 Drawing Sheets

(56) References Cited

OTHER PUBLICATIONS

Github, "logpai/loghub", available online at <https://github.com/logpai/loghub>, 2024, 4 pages.
Hugging Face, "hkunlp / instructor-large", available online at <https://web.archive.org/web/20221221031926/https://huggingface.co/hkunlp/instructor-large>, Dec. 21, 2022, 5 pages.
Vaswani et al., "Attention Is All You Need", 31st Conference on Neural Information Processing Systems (NIPS 2017), Jul. 2023, 15 pages.

* cited by examiner

100

Object-Based System 102

| Processor 104 | Memory 105 |

Machine Readable Media 106

| Data Processing Module 108 | Vector Embedding Module 114 |

| Metadata Module 110 | Action Module 116 |

| Data Object Module 112 |

Log File
Data Store 118

Network
140

User Device(s) 130

| | | | | |
|---|---|---|---|---|
| 51 | 2015-10-17 | 21:48:43,686 | INFO | [main] |
| 52 | 2015-10-17 | 21:48:59,716 | INFO | [SpillThread] |
| 53 | 2015-10-17 | 21:48:59,719 | INFO | [main] |
| 54 | 2015-10-17 | 21:49:00,012 | INFO | [main] |
| 55 | 2015-10-17 | 21:49:00,013 | INFO | [main] |
| 56 | 2015-10-17 | 21:49:00,013 | INFO | [main] org.apache.hadoop.mapred.MapTask: |
| 57 | 2015-10-17 | 21:49:00,013 | INFO | [main] org.apache.hadoop.mapred.MapTask: |
| 58 | 2015-10-17 | 21:49:03,385 | INFO | [main] |
| 59 | 2015-10-17 | 21:49:03,402 | INFO | [main] org.apache.hadoop.mapred.Merger: |
| 60 | 2015-10-17 | 21:49:03,412 | INFO | [main] org.apache.hadoop.mapred.Merger: |
| 61 | 2015-10-17 | 21:49:32,639 | INFO | [main] |
| 62 | 2015-10-17 | 21:49:32,686 | INFO | [main] |
| 63 | 2015-10-18 | 21:49:32,686 | INFO | [main] |

200

210

A

200

210

220

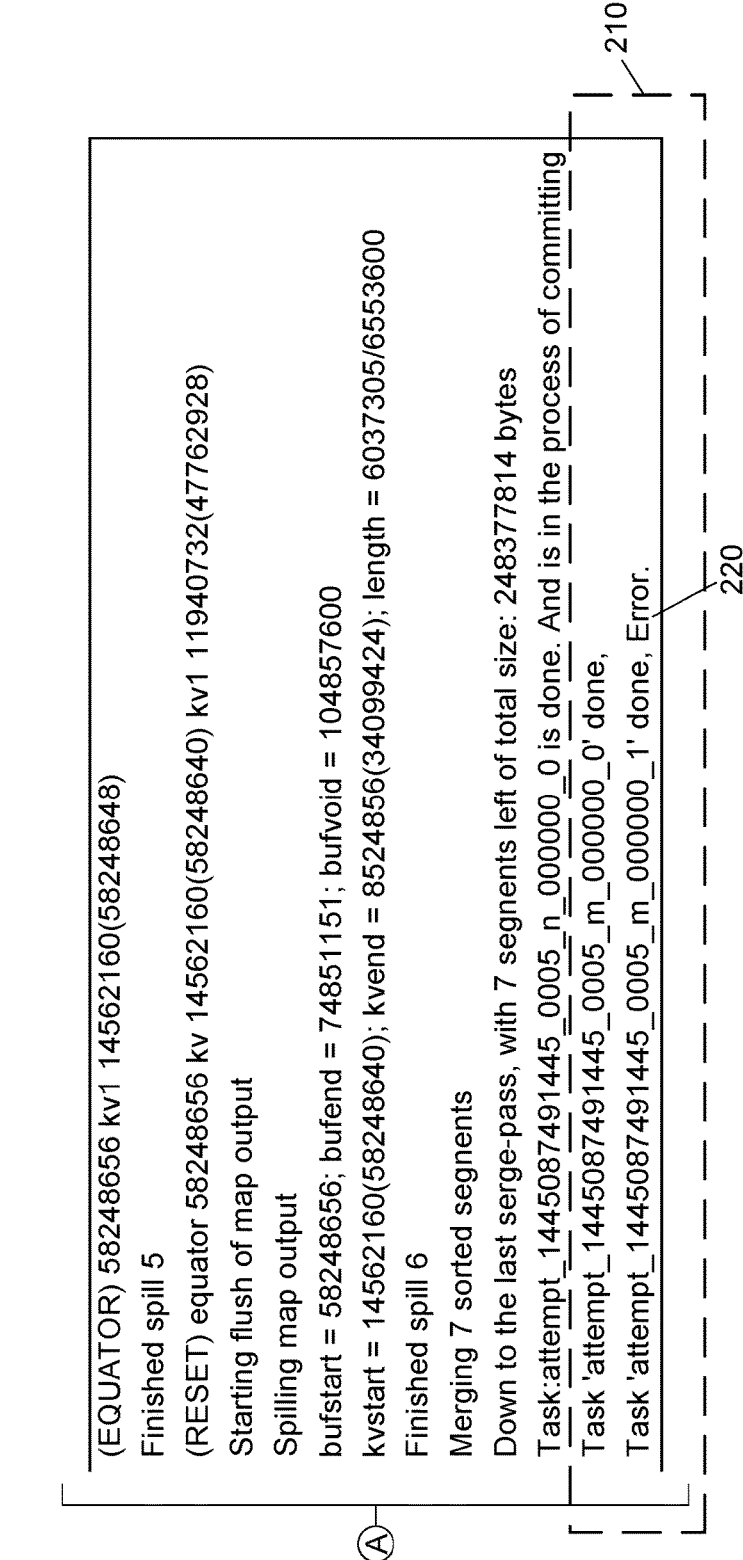

(A)

(EQUATOR) 58248656 kv1 14562160(58248648)

Finished spill 5

(RESET) equator 58248656 kv 14562160(58248640) kv1 11940732(47762928)

Starting flush of map output

Spilling map output bufstart = 58248656; bufend = 74851151; bufvoid = 104857600 kvstart = 14562160(58248640); kvend = 8524856(34099424); length = 6037305/6553600

Finished spill 6

Merging 7 sorted segments

Down to the last serge-pass, with 7 segents left of total size: 248377814 bytes

Task:attempt_14450874491445_0005_n_000000_0 is done. And is in the process of committing Task 'attempt_14450874491445_0005_m_000000_0' done, Task 'attempt_14450874491445_0005_m_000000_1' done, Error.

FIG. 2 (Continued)

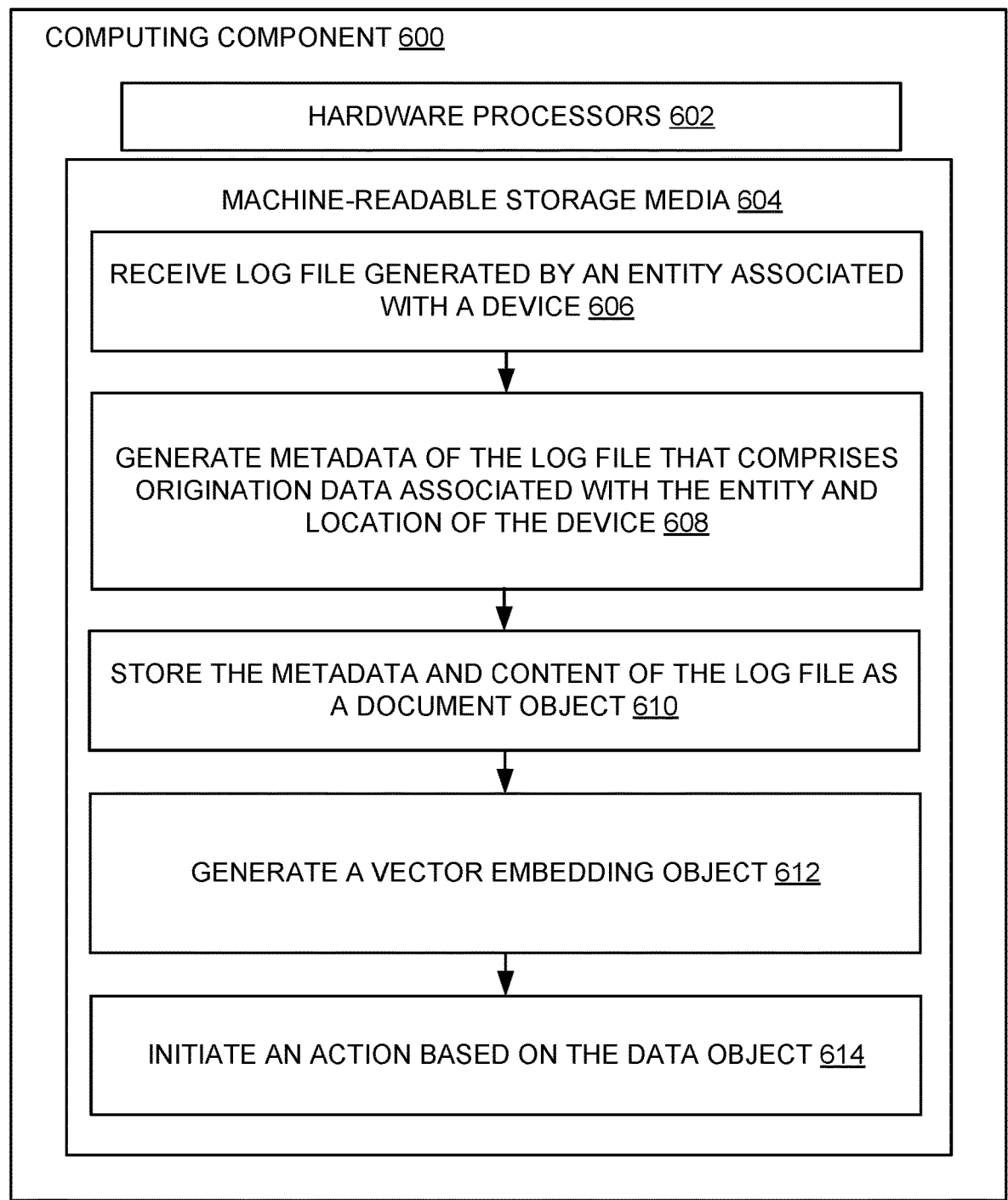

COMPUTING COMPONENT 600

HARDWARE PROCESSORS 602

MACHINE-READABLE STORAGE MEDIA 604

RECEIVE LOG FILE GENERATED BY AN ENTITY ASSOCIATED WITH A DEVICE 606

GENERATE METADATA OF THE LOG FILE THAT COMPRISES ORIGINATION DATA ASSOCIATED WITH THE ENTITY AND LOCATION OF THE DEVICE 608

STORE THE METADATA AND CONTENT OF THE LOG FILE AS A DOCUMENT OBJECT 610

GENERATE A VECTOR EMBEDDING OBJECT 612

INITIATE AN ACTION BASED ON THE DATA OBJECT 614

FIG. 6

Processor
704

Interface
718

Bus
702

Main
Memory
706

ROM
708

Storage
710

Display
712

Input
Device
714

Cursor
Control
716

HIERARCHICAL, TEMPORAL, AND POSITIONAL DATA STRUCTURE FOR GENERATIVE ARTIFICIAL INTELLIGENCE (AI)

BACKGROUND

Operations performed at enterprise computing components are tracked/monitored using log files. The log files can be generated by multiple entities that comprise multiple computational regions and data centers, and each data center may comprise multiple devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 is an example computing component that may be used to implement various features of embodiments described in the present disclosure.

Figure 1:
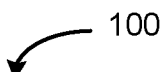
FIG. 1 illustrates an object-based system in communication with user device(s) over a network, in accordance with some examples of the disclosure.

The figures are not exhaustive and do not limit the present disclosure to the precise form disclosed.

DETAILED DESCRIPTION

Log files are often transmitted from multiple, distributed sources. For example, the log files may be generated by multiple entities that comprise multiple computational regions and data centers, and each data center may comprise multiple devices. The devices in the data center may generate log files that are formatted differently from each other, so that when the log files are transmitted to a central repository, the log files cannot easily be combined and analyzed without additional processing and analysis.

In some examples, these log files may be transmitted in a constant stream that can overwhelm the receiving entity/system with massive amounts of data that may need to be reformatted to a standardized format and at an incoming rate that exceeds standard data transmissions. For example, one log file from the constant stream of log files may be generated from a single device with a date component, a timestamp component, potentially a warning/error, an identification of the device generating the data, an identification of a particular software application that is generating the data, and so on. A data center may contain a large number, e.g. thousands, of these devices, e.g. sensors or computes, that generated the detailed log files that are transmitted to the receiving entity/system. In some examples, many of these devices create their own log files and transmit to the log files to the receiving entity/system at a constant rate, which creates multiple streams of incoming log files in various data formats. Some entities may have multiple data centers spanning across multiple geographies (e.g., in North America, Europe, Asia Pacific, or other locations) that contain these multiple devices, which may multiply the amount of data generated and transmitted by these devices. In many instances, the amount of data generated and transmitted as a stream of log data may not be humanly possible to review, let alone generate predictive and prescriptive analytics for the large volume of data.

Managing log files generated at an aggressive volume and frequency can be technically challenging. As an additional challenge, when using a generative AI application or other LLM (large language model), the questions posed to the generative AI application often have a component that is not understandable with standard log content. For example, the log file may include data such as date/time, type of log entry, and text of the operation detected at the device. When the generative AI application receives a question like "did our device have an error in the last week?" the application is unable to parse the log files quickly and efficiently to determine an answer to the question. For example, the log file may comprise a date component, a timestamp component, a warning/error, an identification of the device generating the data, an identification of a particular software application that is generating the data, and so on, as recited above. The question received by the generative AI application includes the term "our device," however the identification of the device that corresponds with "our device" and the other devices that are generating the data may not present in the log file. Rather, the generative AI application may need a list of devices that can be translated to "our device." In another example, the request for the error that occurred "last week" may need additional data corresponding with a current date to calculate a date that would correspond with being data from "last week" in relation to the current time.

Examples of the disclosure includes methods and systems that are configured to generate metadata for an improved data structure that enables improvements to generative AI and LLM processing and use of the data. In some examples, the system may receive a log file generated by an entity associated with a device and generate metadata of the log file that comprises origination data associated with the entity and location of the device. The system may store the metadata and content of the log file as a document object. A data structure may be generated using various data objects. For example, the system can generate a vector embedding object of the document object. A vector embedding object may convert characters (e.g., ABC123) and other data from the document object into numbers that capture the characters' meaning and relationships. The vector embedding object may represent different data types as points in a multidimensional space, where similar data points are clustered closer together. The vector embedding object may be used to generate a temporal embedding and a positional embedding of the vector embedding object. The temporal embedding may add more information to the vector embedding object by including additional numbers to capture the temporal/time component of the data. The temporal component may identify, for example, the time that the data/log file was generated. The positional embedding may also add more information to the vector embedding object. The positional embedding may include additional numbers to capture the position/location component of the data. The positional component may identify, for example, the originating location where the data/log file was generated. In some examples, the methods and systems described in this disclosure may also initiate an action based on the temporal embedding and the positional embedding of the vector embedding object.

In an example, the log file may comprise a continuous stream of log data generated by one or more entities. The system may, in some examples, detect the origin of each log file from distributed sources and data centers, and a hierarchy of the log file. The hierarchy may identify the entity and location data that is not included in the original file, and create metadata associated with each file. A portion of the log file and metadata may be stored in a vector-style database to correlate the file content and metadata in a structured data format. The data may be parsed/chunked with the hierarchy information to comply with token size limitations in external applications (e.g., LLM token size limit).

The system and methods described by the present disclosure may also generate vector embeddings with the parsed/chunked data. Vector embedding objects may represent data instances as vectors in a high-dimensional space to encode semantic relationships and/or similarities between different data points.

Positional/temporal data may be added to the vector embeddings to create an improved data structure that includes a hierarchy of data with positional/temporal data included. Positional data refers to the location where the data is generated and temporal data may refer to the time that the data is generated.

Using this improved data structure, improvements can also be made to generative AI applications or other LLMs by exporting data from the improved data structure and using the exported data as input to the generative AI applications or other LLMs. The generative AI applications or other LLMs can search the exported data to generate responses to new queries from users. For example, the exported data from the improved data structure can create a filtered/limited amount of data that the generative AI application or other LLM will search. Using the filtered/limited data, the generative AI applications or other LLMs may generate the response. The improved responses from the generative AI application may access a limited amount of data that is more targeted and relevant to the posed question/query from the user, which the generative AI application can use in generating a response. For example, when the generative AI application receives a question like "did our device have an error in the last week?" the application is able to filter the accessible data to include only log files that are associated with the entity, the identified devices, and a particular timeframe that was added through the processing. In another example, the system may automatically generate a notification in response to a trigger that an error is identified in log file associated with the metadata. The metadata may be added to each log file in the improved data structure (e.g., to a particular device, time frame, entity, etc.).

FIG. 1 illustrates an object-based system in communication with user device(s) over a network, in accordance with some examples of the disclosure. In example 100, object-based system 102 is in communication with user device(s) 130 via network 140. For example, the log file may be generated by user device(s) 130, transmitted via network 140 to object-based system 102, and stored at log file data store 118 for further access and processing.

Object-based system 102 may comprise, for example, processor 104, memory 105, machine readable media 106, and one or more data stores, including log file data store 118. In some examples, object-based system 102 may comprise a cloud-computing environment that receives and aggregates log files and exports the processed data for other systems, including generative AI applications or other LLMs that rely on improved data and data structures as input.

Processor 104 may comprise a general-purpose or special-purpose processing engine such as, for example, a microprocessor, controller, or other control logic. Processor 104 may be connected to a bus, although any communication medium can be used to facilitate interaction with other components of object-based system 102 or to communicate externally.

Memory 105 may comprise random-access memory (RAM) or other dynamic memory for storing information and instructions to be executed by processor 104. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable media 106 may comprise one or more interfaces, circuits, and modules for implementing the functionality discussed herein. Machine readable media 106 may carrying one or more sequences of one or more instructions processor 104 for execution. Such instructions embodied on machine readable media 106 may enable object-based system 102 to perform features or functions of the disclosed technology as discussed herein. For example, the interfaces, circuits, and modules of machine readable media 106 may comprise, for example, data processing module 108, metadata module 110, data object module 112, vector embedding module 114, and action module 116. In some examples, the modules may correspond with software in the form of an algorithm or machine-readable instructions that are stored in memory 105. The modules may be associated with non-generic placeholders for a structural element of the system.

Data processing module 108 is configured to receive log data as a component of object-based system 102. For example, data processing module 108 may comprise an interface, circuit, or module of machine readable media 106 that is configured to receive the log data. The log data may be stored in a log file that is generated and transmitted by an entity associated with user device(s) 130, including an entity that operates the user device, e.g. sensors or computes, that generated the detailed log files. The entity may correspond with an owner of a data center that physically houses user device(s) 130. An illustrative example of a log file is provided with FIG. 2.

The log data may be generated by a user device(s) 130 that, may for example, include a physical computer chip that is associated with object-based system 102 and located at a distributed location (e.g., at a location associated with the entity/customer). In some examples, the physical chip in the devices may generate the log data as telemetry data or may generate the log data with application specific data that identifies the application that is performing the operations noted in the log file. In some examples, the log file may comprise system-specific log data.

User device 130 associated with the entity may correspond with a physical location or region. In some examples, the entity is associated with a plurality of regions and the plurality of regions each comprise a plurality of data centers. In some examples, the plurality of data centers each comprise a plurality of devices that generate log files associated with devices in the plurality of devices. These features of the data may correspond with a hierarchy, such that "N" number of customers/entities transmit log files to object-based system 102 via network 140. Of the "N" number of customers/entities, each one may have multiple different regions, each region may have multiple different data centers, and each data center may have multiple different servers/devices. Of the servers/devices, each one may generate a stream of log data (e.g., as a continuous file transfer, or once per time period).

In some examples, data processing module 108 receives an abundance of log data where individual entries of the log data are generated multiple times per second. The log data may identify captured events, activities, errors, or other relevant information within user device(s) 130. In some examples, the line of log data may correspond with an individual event occurring at user device(s) 130. Individual events may correspond with, for example, a boot process, flushing/expunging a memory device, initiating/stopping a process or task, merging/adjusting memory stores, or other operations executed at user device(s) 130.

Various types of data generation and data transmission are applicable. For example, the log data may be constantly received, e.g. streaming data received by data processing module 108 from user device(s) 130, or constantly generated by user device(s) 130 and received by data processing module 108 from user device(s) 130. The streaming data may be generated in real-time by user device(s) 130 and transmitted to object-based system 102 in an ongoing, sequential manner. In some examples, the log files are part of a stream of log files generated by the entity as a continuous stream of log files comprising telemetry data associated with user device(s) 130 associated with the entity.

Devices that generate the log files may vary by implementation without limiting the scope of the disclosure. The devices may include, for example, sensors, cloud-based storage devices, virtual machines, or other components capable of generating log files. In some examples, user device(s) 130 may be located in distributed data centers associated with different entities. Individual entities may generate log data in accordance with different data structures and formats.

Metadata module 110 may be configured to generate metadata of the log data. In some examples, the metadata of the log file may comprise origination data associated with the entity and location of the device. For example, the transmission via network 140 may comprise a header component of the data packet that identifies the source of the log data that originated the log file, including an entity/customer, region, data center, server/device, log file, or other information. The information from the header component may be associated as metadata with the log data. In some examples, the metadata may be stored in a structured data store like log file data store 118, to associate the metadata/origination with the appropriate log files.

In some examples, the origination data may be stored in a hierarchical format. The levels of the hierarchy may correspond with a one-to-many parent-child relationship between the data nodes, such that the entity/customer data type corresponds with one or more region data types, the region data type corresponds with one or more data center data types, and so on.

Metadata module 110 may also be configured to associate a timestamp or other features of the data in the log file with a particular line in the log file for data processing functionality. For example, the metadata may be stored as a data type for a particular line in the log file. Using the additional metadata stored at a line-level of the log file, metadata module 110 can enable a filtering functionality that can let users operate a display to view a subset of the log data that complies with the origination data.

Data object module 112 is configured to generate and store the metadata (generated by Metadata module 110) and content of the log file (generated/processed by data processing module 108) as a document object. The data object may correspond with a unit of information that encapsulates the data, the data characteristics, and the operations or methods that can be performed on that data.

In some examples, the data object is created through instantiation, where the log file from a particular origination source is associated with a particular data object. The metadata that defines the entity/customer, region, data center, server/device, log file, or other information may be matched to the particular type of data object for that source.

In some examples, the data object may be chunked or parsed into smaller objects while maintaining the data embedded therein. The chunked data objects can be recombined with each other to mirror the data that was stored with the data object before the chunking operation was initiated.

Data object module 112 may generate chunks of data for various uses. For example, the chunks of data of the document object may be generated to comply with token size limitations in an external application or application programming interface (API). The chunks of data may be used to generate the vector embeddings.

In some examples, an anomaly scoring process is initiated. For example, individual chunks of data may be processed and summarized. The summarized chunk of data may be analyzed to determine whether the chunk is an error chunk prior to transmitting the chunk to a machine learning model (e.g., large language model or "LLM").

Vector embedding module 114 is configured to generate various embeddings, including a vector embedding, positional embedding, temporal embedding, and hierarchy embedding. The embeddings may be generated as objects of the document object to help incorporate a sequential and sortable order in the data. In some examples, the embeddings may be added to the chunks.

A vector embedding may correspond with a representation of the data/document objects generated by object-based system 102 as vectors in a continuous, high-dimensional space. The vector embedding may store semantic relationships or similarities between the objects to help define the inherent structure and meaning of the data. In some examples, the vector embedding object complies with a 512-dimensional vector.

In some examples, the vector embeddings are a continuous representation of objects, as opposed to discrete or symbolic representations, and the similar objects represented by vectors are closer to each other in the embedding space. The vector embedding generates a geometric distance between vectors that reflects semantic similarity, and operations on the vectors can capture the semantic relationships between the data.

A positional embedding may correspond with adding position or order to the vector embeddings that include the semantic similarities. The position or order of elements in the vector may be stored to identify the sequence associated with the data that may have been lost in processing (e.g., the device location associated with the origination entity, location/region, data center, or other positional data associated with the device that generated the log files).

In some examples, machine learning models like those used in natural language process (NLP), may not inherently capture the sequential order of input tokens because the models process the data/tokens in parallel. The positional embeddings may be added to the vector embeddings to provide the machine learning models with information about the position of the data/tokens in the sequence (e.g., in the sequential order of the individual line entries in the log files).

A temporal embedding may correspond with adding a timing or order to the vector embeddings that include the semantic similarities in the timing of the element in the vector. The timing or order of elements in the vector may be stored to identify the sequence associated with the data that may have been lost in processing (e.g., the timestamp or time series features of the log files).

In some examples, machine learning models like those used in natural language process (NLP), may not inherently capture the temporal order of input tokens because the models process the data/tokens in parallel. The temporal embeddings may be added to the vector embeddings to provide the machine learning models with information about the timing/order of the data/tokens in the sequence (e.g., in the date/time order of the individual line entries in the log files).

In some examples, the temporal embedding and the positional embedding of the vector embedding object is generated using sine/cosine functions to add temporal/positional data to the vector embedding object. Additional detail on the interactions between the entity and various modules of object-based system 102 is provided in the description corresponding to FIG. 5 below.

Hierarchy embedding may correspond with adding a data type hierarchy to the vector embeddings that include the semantic similarities. The data type hierarchy of elements in the vector may be stored to identify similar data types associated with the data that may have been lost in processing (e.g., data types corresponding with the entity, location/region, data center, or device that generated the log files).

Action module 116 is configured to initiate an action in association with the data. The action may comprise various operations that are executed, for example, transmitting the data objects to a generative artificial intelligence (AI) application or other large language model (LLM), generating/transmitting a notification to an administrative user associated with the entity or user device 130, initiating a boot sequence to restart the device, or transmitting prescriptive suggestion to perform an action by the user operating user device 130, among other actions.

The action initiated by action module 116 may correspond with transmitting the temporal embedding and the positional embedding of the vector embedding object to a generative AI application or other LLM. The action may correspond with updating/improving a generative AI or LLM using the temporal embedding and the positional embedding of the vector embedding object. In some examples, the temporally- and positionally-enhanced data may be passed into the LLM so that the LLM can use the data to provide responses to search queries. The search query may comprise, for example, a request to find anomalies in a subset of data. The anomalies may be identified and removed, so that the quality of data is improved overall.

The action initiated by action module 116 may correspond with generating/transmitting a notification to an administrative user associated with the entity or user device 130. In some examples, the administrative user may access a display that receives search queries. The search queries may be submitted to the data store that has been updated with the hierarchy of temporal embeddings and positional embeddings in the vector data. The system may return relevant data in response to the search query. in some examples, the search queries may comprise text-based questions, like "when was the last time the map task was called?" The response/results may comprise relevant data entries or chunks of data, in ascending order, for the particular timestamp identified in the search query. In some examples, the question/answer-based style may be used to help the administrative user figure out critical issues in their data centers.

The action initiated by action module 116 may correspond with initiating an operation at user device 130, including initiating a boot sequence to restart the device. For example, the action may comprise an API call to user device 130 that restarts user device 130 or sends an alert to the administrative user to restart user device 130.

The action initiated by action module 116 may correspond with a prescriptive suggestion to perform an action by the user operating user device 130. The prescriptive suggestion can generate a request to perform an action that may help generate additional data or log files. The prescriptive suggestion may be transmitted to user device 130. Once the prescriptive suggestion is transmitted, the actions performed at user device 130 may generate additional information.

Figure 2:
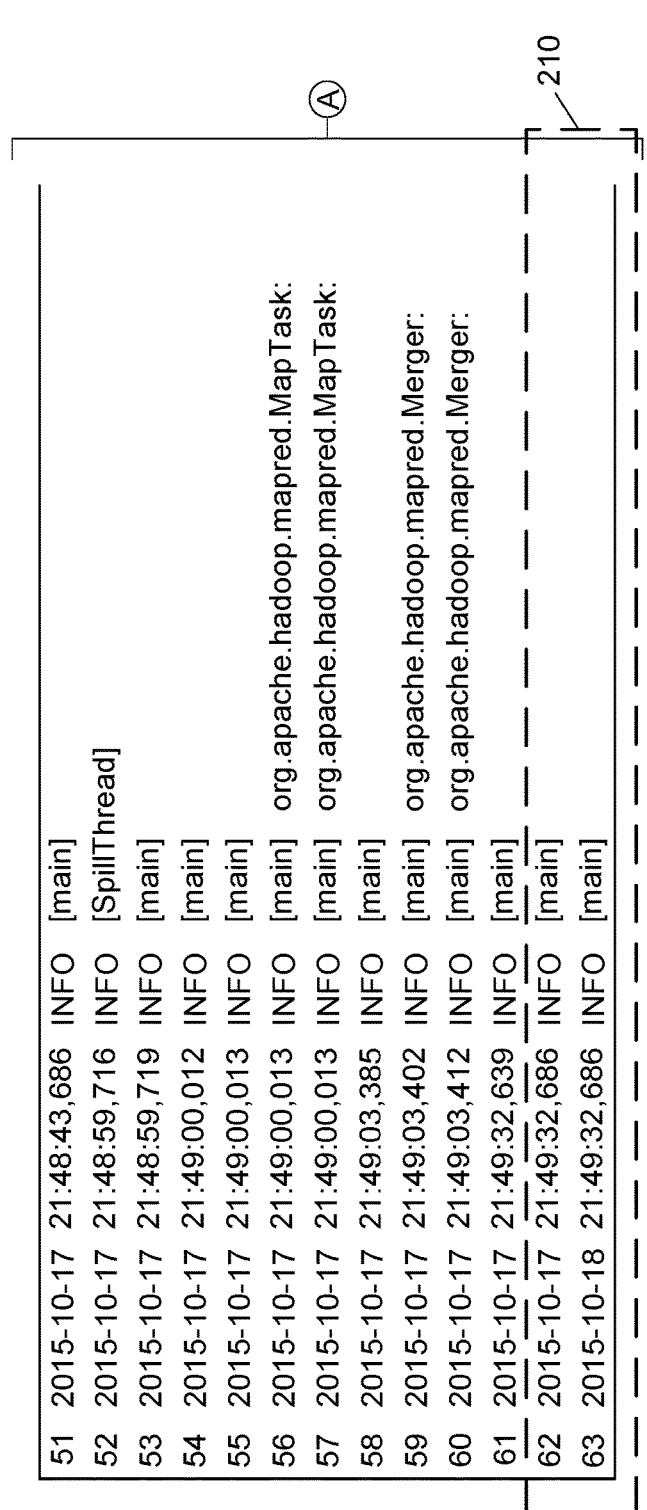
FIG. 2 is an illustrative log file, in accordance with some examples of the disclosure.

FIG. 2 is an illustrative log file, in accordance with some examples of the disclosure. In some examples, the log file is generated by user device(s) 130, transmitted via network 140 to object-based system 102, and stored at log file data store 118 for further access and processing, as illustrated in FIG. 1.

In example 200, multiple lines 210 of the log file are provided. At line 62, the data entry is provided on the date "2015 Oct. 17" and at line 63, the data entry is provided on the date "2015 Oct. 18." The remaining information may be very similar in identifying a task that is executed. At line 62, the task "attempt_1445 . . . " is executed and at line 63, the executed task returns an "error" (see error 220 of "FIG. 2 Continued") both of which are added as entries to the log file.

In a traditional vector database, the system may group line 62 and line 63 together based on the similarities of their textual data and that they comprise several similar features in the log file. In aspects of the present disclosure, the temporal embedding and positional embedding may be added to the database entries to help add physical information to the data entry, including the timing and location/device that generated the data entry, and improve the data structure overall.

Figure 3:
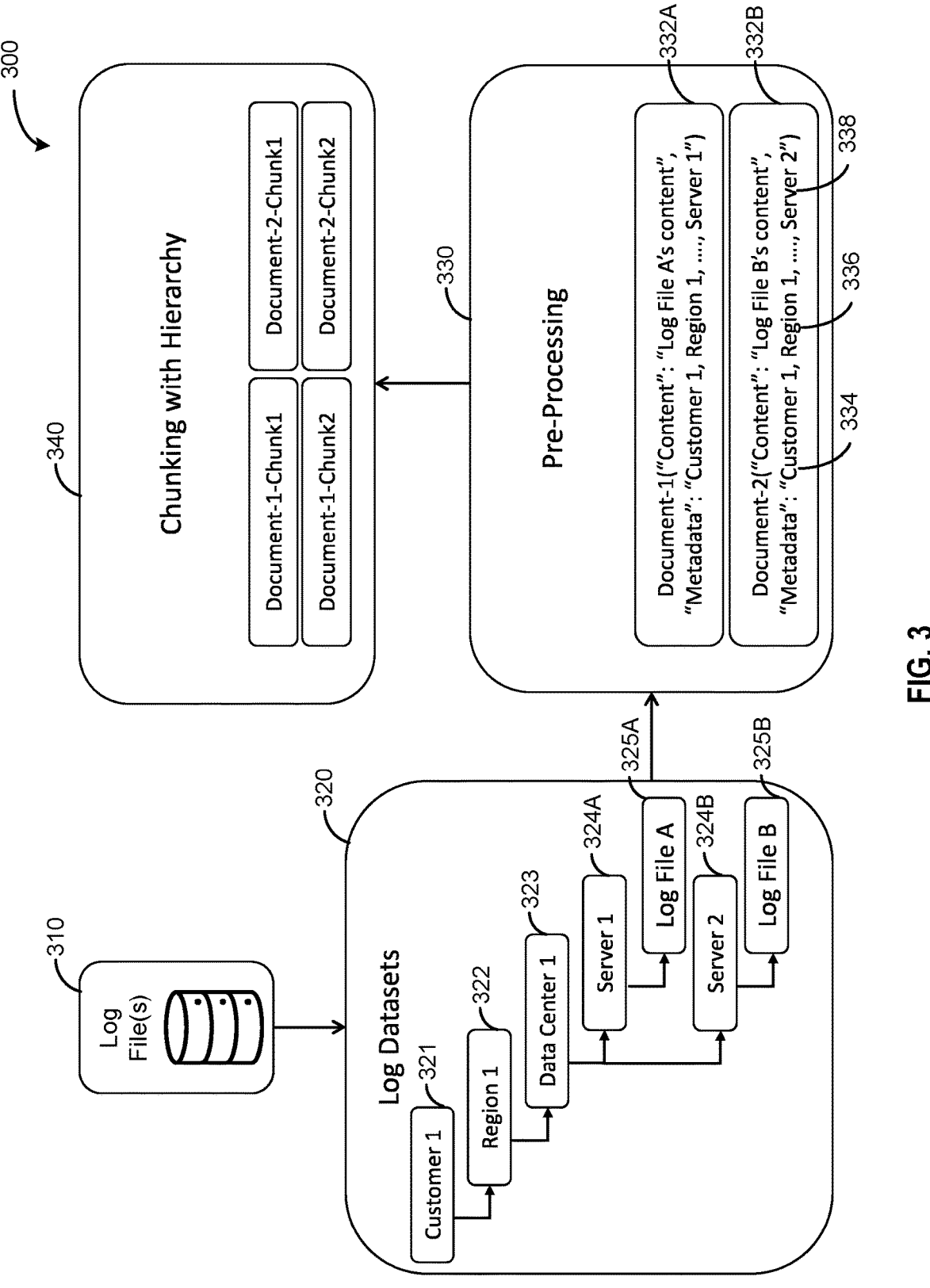
FIG. 3 is a portion of the object-based system for pre-processing and embedding of metadata, in accordance with some examples of the disclosure.

FIG. 3 is a portion of the object-based system for pre-processing and embedding of metadata, in accordance with some examples of the disclosure. In some examples, the processing is performed by object-based system 102 as illustrated in FIG. 1. In example 300, various portions of the log file processing are provided for illustrative purposes.

At block 310, the log file is received by object-based system 102 from user device(s) 130. For example, the log file includes a date/time, type of log entry, and text of the operation detected at the device.

At block 320, the datasets are generated with additional metadata. The metadata may comprise, in some examples, customer/entity 321, region 322, data center 323, server/device 324 (illustrated as first server 324A and second server 324B), log file 325 (illustrated as first log file 325A and second log file 325B), and so on, to help associate positional data with the log files. Although one or two instances of types of metadata are illustrated in example 300, more or fewer instances may be implemented without diverting from the essence of the disclosure. As an illustrative example, customer/entity 321 may exist in multiple regions, illustrated as region 322, and the additional regions may be added as metadata.

In some examples, the datasets may be supplemented with the hierarchy of the data, which is added as metadata to form a hierarchy of metadata. The hierarchy may be defined by an administrative user and an automated process may add the metadata to the datasets. For example, first server 324A may be identified as generating first log file 325A. Object-based system 102 may add the previous data types to the metadata in an automated process, including adding an identifier associated with customer/entity 321, region 322, and data center 323. In this example, data that was received in the log file may be supplemented/enriched with the hierarchy of data to store in the dataset, including an identifier associated with customer/entity 321, region 322, data center 323, first server 324A, and first log file 325A.

At block 330, pre-processing on containers is initiated. For example, two containers are illustrated (illustrated as first container 332A and second container 332B). One log file may be stored in one container, for example, a first log file may be stored in first container 332A and a second log file may be stored in second container 332B. The container-type data repository may help store and organize data within a cloud-based storage system. In some examples, the data repository may serve as a top-level namespace for the container. The containers may correspond with the physical data types that are used to group and manage related sets of objects.

In some examples, the container is partitioned with folders corresponding with each data type to the metadata. In other words, one folder is associated with customer/entity one, another folder is associated with a region, another folder is associated with a data center, and so on. The folder may also correspond with a hierarchy, such that the hierarchy may be used to generate metadata that is stored in a vector database (e.g., as implemented with object-based system 102 in FIG. 1).

As illustrated in second container 332B, which corresponds with a single log file, metadata is added to the container to identify the hierarchy of the device that generated the log file, including customer/entity 334, region 336, device 338, and so on.

In pre-processing of the containers, the process may access each log file in the container format that contains the additional, generated metadata and parse the data to generate the data object. The hierarchy data in the data dictionary may be used to generate a data object that comprises a content key value pair and a metadata key value pair.

For example, the pre-processing may parse the hierarchy of data in the container/bucket format in association with a data dictionary. The data dictionary may correspond with a particular data format for the data object. for example, the data object may correspond with a first data type "content" and store the corresponding content from the log file as that data type, and a second data type "metadata" and store the corresponding generated metadata associated with the log file as that data type (e.g., entity/customer, region, data center, etc.).

At block 340, chunking is initiated with the hierarchy to create data object chunks that are smaller than the original data objects. For example, a process may separate the data/document object into chunks of data that are smaller file sizes than the original objects (e.g., object 1/chunk 1, object 1/chunk 2, object 2/chunk 1, object 2/chunk 2, etc.). The smaller pieces/chunks may comprise the hierarchy data dictionary embedded as metadata with each chunk.

In some examples, the chunks can correspond with a particular size. The size of each chunk may be determined based on an application's file size requirements, available memory, network bandwidth, or other considerations. In some examples, the destination/device that receives the vector embedding at the end of the process may restrict data to a particular token size limit. In instances where the log files are larger than the token size limit, the chunking process may help reduce the size of the data in order to transmit the context vectors to the large language models. Although two chunks are illustrated for the container provided in example 300, more than two or less than two chunks may be implemented without diverting from the essence of the disclosure.

In some examples, the size and number of chunks may be dynamically determined based on formatting limitations implemented by the data receiver (e.g., where the data is being received). For example, the chunks of data of the document object may be generated to comply with token size limitations in an external application or application programming interface (API).

In some examples, the chunks can be sequential, where each chunk follows the previous chunk in a linear or overlapping order. When the chunks correspond with an overlapping order, some data may be shared between adjacent chunks.

Figure 4:
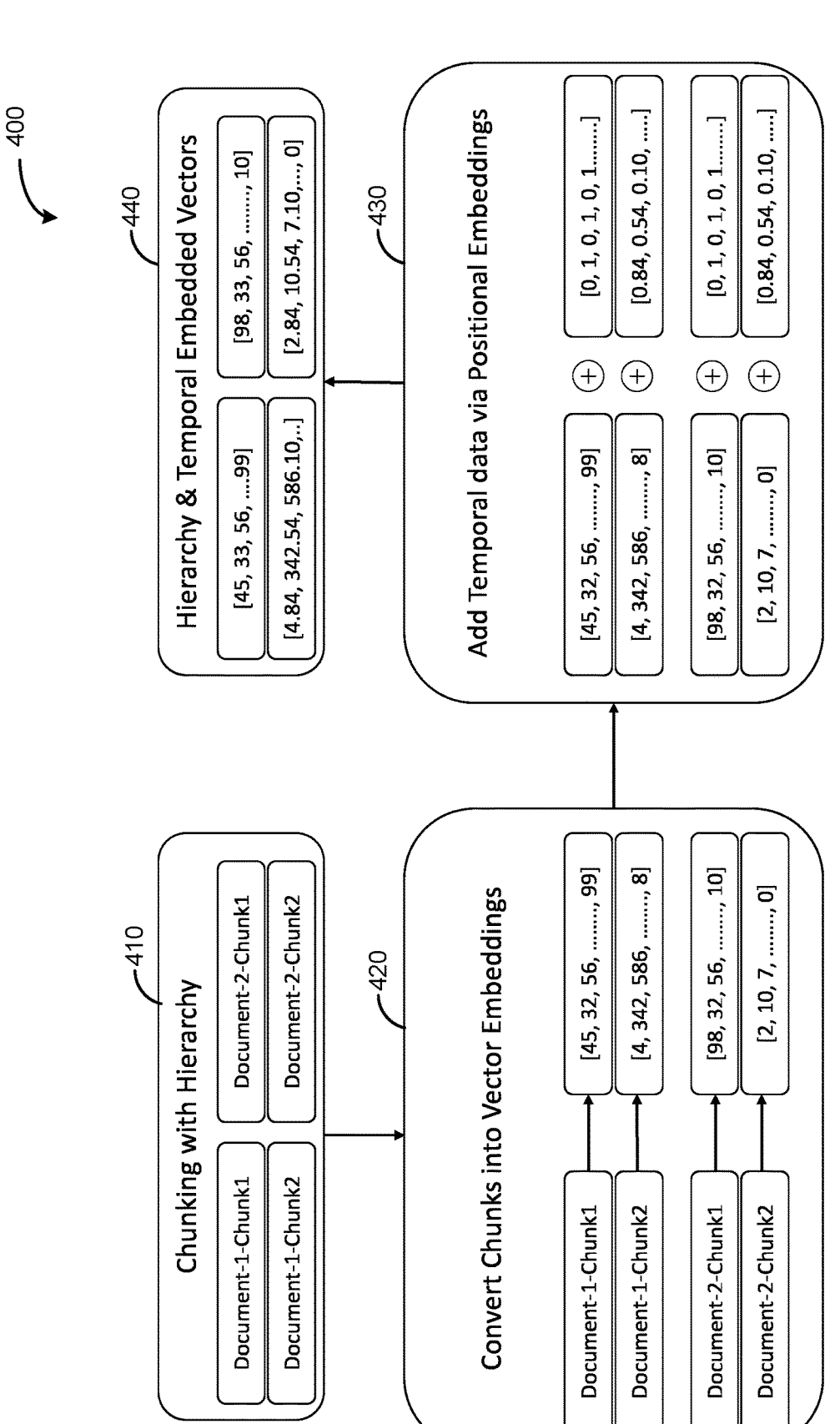
FIG. 4 is a portion of the object-based system for converting data into embedding objects, in accordance with some examples of the disclosure.

FIG. 4 is a portion of the object-based system for converting data into embedding objects, in accordance with some examples of the disclosure. In some examples, the processing is performed by object-based system 102 as illustrated in FIG. 1.

At block 410, the data object chunks that are smaller than the original data objects are accessed to initiate the conversion of the data objects into vector embeddings. The data objects may be received from the process corresponding with block 340 in FIG. 3 or another process utilizing stored data with the system.

At block 420, the data object chunks may be converted into vector embeddings. The vector embeddings may correspond with a representation of the data/document objects as vectors in a continuous, high-dimensional space. The vector embedding may store semantic relationships or similarities between the objects to help define the inherent structure and meaning of the data. For example, each chunk may be provided to an embedding process that embeds a log chunk into a multi-dimensional vector. The multi-dimensional vector may correspond with a 512-dimensional vector, although any dimension of vector may be used without diverting from the essence of the disclosure.

At block 430, temporal data may be added via positional embeddings. For each of the chunks that are represented as vectors, a sine/cosine function may be used to add positional or temporal data to the original vector embeddings.

Positional embedding may correspond with adding position or order to the vector embeddings that include the semantic similarities. The position or order of elements in the vector may be stored to identify the sequence associated with the data that may have been lost in processing (e.g., the device location associated with the origination entity, location/region, data center, or other positional data associated with the device that generated the log files).

Temporal embedding may correspond with adding a timing or order to the vector embeddings that include the semantic similarities in the timing of the element in the vector. The timing or order of elements in the vector may be stored to identify the sequence associated with the data that may have been lost in processing (e.g., the timestamp or time series features of the log files).

At block 440, a temporal embedding may be generated and added to the data object. The temporal embedding may add more information to the object by including additional numbers to capture the temporal/time component of the data. The temporal embedding may identify, for example, the time that the data/log file was generated.

Hierarchy embedding may correspond with adding a data type hierarchy to the vector embeddings that include the semantic similarities. The data type hierarchy of elements in the vector may be stored to identify similar data types associated with the data that may have been lost in processing (e.g., data types corresponding with the entity, location/region, data center, or device that generated the log files) and the generated positional embeddings and temporal embeddings that form the hierarchy of data.

Figure 5:
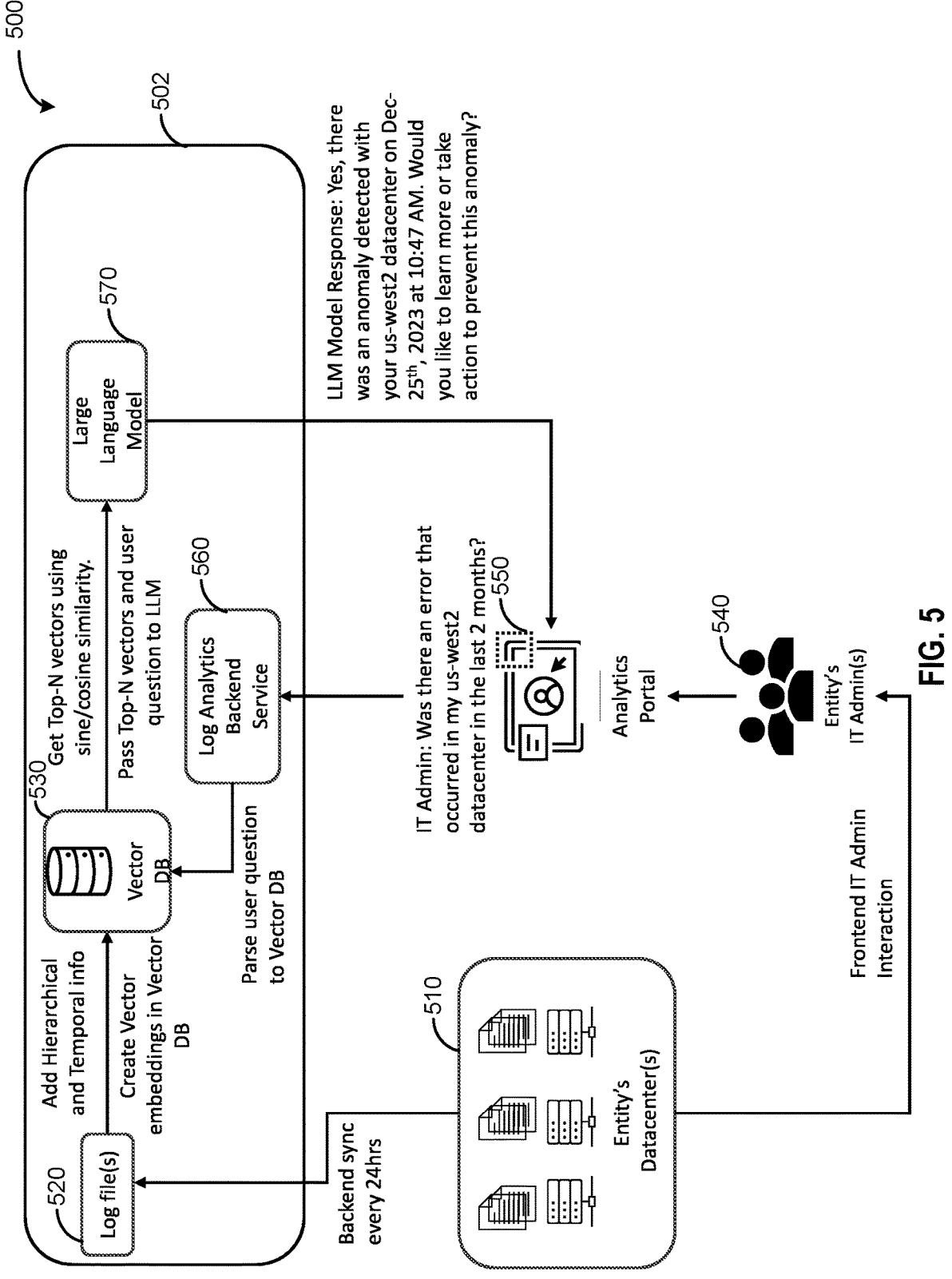
FIG. 5 is an example workflow summary that may be used to implement various features of embodiments described in the present disclosure.

FIG. 5 is an example workflow summary that may be used to implement various features of embodiments described in the present disclosure. In example 500, an entity may correspond with data center 510 (at one or more locations) and an administrative user 540, both of which may interact with object-based system 502, as described herein (e.g., object-based backend 102 in FIG. 1), via a network. Both backend interactions (e.g., log files generated by the data center) and frontend interactions (e.g., by the administrative user) from the entity may be implemented.

In some examples, data center 510 may transmit log file 520 on a recurring schedule (e.g., every 24 hours) to object-based system 502. Log file 520 may be received by object-based system 502. Object-based system 502 can initiate processing on log file 520 to generate a vector embedding object, a temporal embedding, a positional embedding, and/or a hierarchy (e.g., that adds a hierarchy/sorted order to the vector embedding object). In some examples, the vector embedding object, temporal embedding, positional embedding, and hierarchical information may be stored with the information associated with log file 520 in vector database 530.

In some examples, the machine learning model is implemented as an LLM, which can be based on a transformer architecture. Transformer architecture may correspond with a neural network that can learn the context and hierarchy of the log files by tracking relationships in sequential data. In this instance, the addition of the temporal embedding, positional embedding, or the hierarchy of the metadata may help add the sequential data so that the transformer architecture can use the data to generate inferences from the data. In some examples, the transformer architecture may natively use positional embeddings to maintain the temporal and sequential information present in the data. Additionally, LLMs may implement a pre-set token size, which can restrict the size of the received log file or otherwise continuous stream of logs. Accuracy of responses to questions/queries may be limited by limited token sizes and restrictive transformer architecture.

In some examples, LLMs may hallucinate if the input/context is not relevant to the question. As a result, object-based system 502 may implement vector databases to return relevant vectors. The vector databases may be part of a RAG (Retrieval Augmented Generation) architecture, where vector databases return the top number of relevant vectors. The top number of relevant vectors may be passed to the LLM to reduce model hallucinations. In some examples, traditional vector databases may not maintain temporal and hierarchical information themselves, unlike LLMs. As such, object-based system 502 may add these temporal and hierarchical embeddings to the underlying vector embeddings.

With this improved data structure, administrative user 540 of the entity may submit a question/query to analytics portal interface 550. The question/query may be in association with the log files generated by data center 510 and the corresponding log files 520 received by object-based system 502. As an illustrative example, the question/query may comprise "was there an error that occurred in my us-west2 data center in the last two months?" Object-based system 502 can receive the question/query at one of the described modules 560 to parse the question/query. The parsed question/query may be provided to vector database 530.

In some examples, a portion of the vectors from vector database 530 may be provided to a machine learning model 570 (e.g., large language model (LLM), etc.). The portion of vectors provided to the machine learning model 570 may comprise a top number of relevant vectors based on a query/question from the entity using a cosine similarity algorithm.

The cosine similarity may be used to retrieve the top number of relevant vectors. These top number of relevant vectors may be more "relevant" to the user's question, as it now uses the hierarchical and temporal embeddings generated by object-based system 502. The top number of relevant vectors may be then passed into machine learning model 570 to generate the most accurate response back to the user. For example, machine learning model 570 may be trained to provide a response to the query/question based on the processed data. The response can include the following types of responses: question-answer (as illustrated in FIG. 5), root-cause analysis, summary, reports, and more. As an illustrative example, the response may comprise "yes, there was an anomaly detected with your us-west2 data center on Dec. 25, 2023 at 10:47 AM. Would you like to learn more or take action to prevent this anomaly?"

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 6 illustrates an example computing component that may be used to implement burst preloading for available bandwidth estimation in accordance with various embodiments. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-614, to control processes or operations for burst preloading for available bandwidth estimation. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-614.

Hardware processor 602 may execute instruction 606 to receive a log file generated by an entity associated with a device. The log file may comprise system-specific log data. For example, the log file includes a date/time, type of log entry, and text of the operation detected at the device.

Hardware processor 602 may execute instruction 608 to generate metadata of the log file that comprises origination data associated with the entity and location of the device. The metadata may comprise, in some examples, customer/entity, region, data center, server/device, log file, and so on, to help associate positional data with the log files. In some examples, the information from the header component may be associated as metadata with the log data.

Hardware processor 602 may execute instruction 610 to store the metadata and content of the log file as a document object. For example, the metadata and content of the log file may comprise origination data associated with the entity and location of the device. The data structure may be a structured data store to associate the metadata/origination with the appropriate log files.

Hardware processor 602 may execute instruction 612 to generate a vector embedding object enriched with a temporal embedding, a positional embedding, and a hierarchy of the metadata. For example, the vector embedding object of the document object may represent the metadata and content of the log file as vectors to encode semantic relationships or similarities between different data points in the metadata and content of the log file. The temporal embedding and positional embedding of the vector embedding object may help enrich the vector embedding object. In some examples, a hierarchy may also be added to the vector embedding object.

Hardware processor 602 may execute instruction 614 to initiate an action based on the data object. The action may be based on the temporal embedding and the hierarchy of the metadata enriched with the vector embedding object associated with the entity or the location of the device. For example, the action may be based on the temporal embedding and the positional data object of the vector embedding associated with the entity or the location of the device.

The action may comprise various operations that are executed, including transmitting the data objects to a generative artificial intelligence (AI) application or other large language model (LLM), generating/transmitting a notification to an administrative user associated with the entity, initiating a boot sequence to restart the device, or transmitting prescriptive suggestion to perform an action by the user operating the user device, among other actions.

The action may correspond with transmitting the temporal data object and the positional data object of the vector embedding object to a generative AI application or other LLM. The action may correspond with updating/improving a generative AI or LLM using the temporal data object and the positional data object of the vector embedding object. In some examples, the temporally- and positionally-enhanced data may be passed into the LLM so that the LLM can use the data to provide responses to search queries. The search query may comprise, for example, a request to find anomalies in a subset of data. The anomalies may be identified and removed, so that the quality of data is improved overall.

The action may correspond with generating/transmitting a notification to an administrative user associated with the entity. In some examples, the administrative user may access a display that receives search queries. The search queries may be submitted to the data store that has been updated with the hierarchy of temporal embeddings and positional embeddings in the vector data. The system may return relevant data in response to the search query. in some examples, the search queries may comprise text-based questions, like "when was the last time the map task was called?" The response/results may comprise relevant data entries or chunks of data, in ascending order, for the particular timestamp identified in the search query. In some examples, the question/answer based style may be used to help the administrative user figure out critical issues in their data centers.

The action may correspond with initiating an operation at the user device, including initiating a boot sequence to restart the device. For example, the action may comprise an API call to the user device that restarts the user device or sends an alert to the administrative user to restart the user device.

The action may correspond with prescriptive suggestion to perform an action by the user operating the user device.

Figure 7:
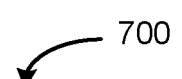
FIG. 7 depicts a block diagram of an example computer system in which various of the embodiments described herein may be implemented.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes an interface 718 coupled to bus 702. Interface 718 provides a two-way data communication coupling to one or more network links that are connected to one or more local networks. For example, interface 718 may be an integrated services digital network (ISDN) card, cable modem, satellite modem, or a modem to provide a data communication connection to a corresponding type of telephone line. As another example, interface 718 may be a local area network (LAN) card to provide a data communication connection to a compatible LAN (or WAN component to communicated with a WAN). Wireless links may also be implemented. In any such implementation, interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 718, which carry the digital data to and from computer system 700, are example forms of transmission media.

The computer system 700 can send messages and receive data, including program code, through the network(s), network link and interface 718. In the Internet example, a server might transmit a requested code for an application program through the Internet, the ISP, the local network and interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:

receiving a log file generated by an entity associated with a device;

generating metadata of the log file that comprises origination data associated with the entity and a location of the device;

storing a data object that encapsulates the metadata, the content of the log file, and an operation or method that is permitted to be performed on the metadata and the content of the log file;

generating a vector embedding object of the data object that represents the metadata, the content of the log file, and the operation or method that is permitted to be performed on the metadata and the content of the log file as vectors to encode semantic relationships between different data points in the metadata and the content of the log file;

enriching the vector embedding object with a temporal embedding and a hierarchy of the metadata;

storing the enriched vector embedding object in a dataset within memory; and facilitating generation of an output by a downstream artificial intelligence (AI) application by providing the enriched vector embedding object including the temporal embedding and the hierarchy of the metadata as input to the AI application to supplement the content of the log file.

2. The method of claim 1, wherein the entity is associated with a plurality of regions, the plurality of regions each comprise a plurality of data centers, and the plurality of data centers each comprise a plurality of devices that generate log files associated with devices in the plurality of devices.

3. The method of claim 1, wherein the log file is part of a stream of log files generated by the entity as a continuous stream of log files comprising telemetry data associated with devices of the entity.

4. The method of claim 1, further comprising:

generating chunks of data of the data object to comply with token size limitations in an external application; and using the chunks of data to generate the vector embedding object.

5. The method of claim 1, wherein the vector embedding object complies with a 512-dimensional vector.

6. The method of claim 1, wherein information associated with the temporal embedding is added to the vector embedding object using a positional embedding to enrich the vector embedding object, and the vector embedding object enriched with the temporal embedding is used to generate top-N vectors using sine/cosine functions.

7. The method of claim 6, wherein the action transmits the top-N vectors to a generative artificial intelligence (AI) application or other large language model (LLM).

8. The method of claim 1, wherein the action generates a notification to an administrative user associated with the entity or the device.

9. A computer system comprising:

a memory; and a processor that is configured to execute machine readable instructions stored in the memory for causing the processor to:

generate and store metadata of a log file associated with an entity that comprises origination data associated with the entity and location of a device that generated the log file;

generate a data object that encapsulates the metadata, content of the log file, and an operation or method that is permitted to be performed on the metadata and the content of the log file;

generate a vector embedding object that represents the metadata, the content of the log file, and the operation or method that is permitted to be performed on the metadata and the content of the log file to encode semantic relationships between different data points in the metadata and the content of the log file;

enrich the vector embedding object with a positional embedding and a hierarchy of the metadata;

store the enriched vector embedding object in a dataset within the memory; and facilitate generation of an output by an artificial intelligence (AI) application by providing the enriched vector embedding object including the positional embedding and the hierarchy of the metadata as input to the AI application to supplement the content of the log file.

10. The computer system of claim 9, wherein the entity is associated with a plurality of regions, the plurality of regions each comprise a plurality of data centers, and the plurality of data centers each comprise a plurality of devices that generate log files associated with devices in the plurality of devices.

11. The computer system of claim 9, wherein the log file is part of a stream of log files generated by the entity as a continuous stream of log files comprising telemetry data associated with devices of the entity.

12. The computer system of claim 9, wherein the machine readable instructions stored in the memory further cause the processor to:

generate chunks of data of the data object to comply with token size limitations in an external application; and use the chunks of data to generate the vector embedding object.

13. The computer system of claim 9, wherein the vector embedding object complies with a 512-dimensional vector.

14. The computer system of claim 9, wherein information associated with a temporal embedding is added to the vector embedding object using the positional embedding to enrich the vector embedding object, and the vector embedding object enriched with the temporal embedding is used to generate top-N vectors using sine/cosine functions.

15. The computer system of claim 14, wherein the action transmits the top-N vectors to a generative artificial intelligence (AI) application or other large language model (LLM).

16. The computer system of claim 9, wherein the action generates a notification to an administrative user associated with the entity or the device.

17. A non-transitory computer-readable storage medium storing a plurality of instructions executable by a processor, the plurality of instructions when executed by the processor cause the processor to:

receive a log file generated by a device associated with an entity;

generate metadata that defines the entity and location of the device that generated the log file;

generate a data object that encapsulates the metadata, content of the log file, and an operation or method that is permitted to be performed on the metadata and the content of the log file;

generate a vector embedding object that represents the metadata, the content of the log file, and the operation or method that is permitted to be performed on the metadata and the content of the log file to encode semantic relationships between different data points in the metadata and the content of the log file;

enrich the vector embedding object with a temporal embedding and a hierarchy of the metadata;

store the enriched vector embedding object in a dataset within memory; and facilitate generation of an output by an artificial intelligence (AI) application by providing the enriched vector embedding object, the temporal embedding and the hierarchy of the metadata as input to the AI application to supplement the content of the log file.

18. The non-transitory computer-readable storage medium of claim 17, wherein the entity is associated with a plurality of regions, the plurality of regions each comprise a plurality of data centers, and the plurality of data centers each comprise a plurality of devices that generate log files associated with devices in the plurality of devices.

19. The non-transitory computer-readable storage medium of claim 17, wherein the log file is part of a stream of log files generated by the entity as a continuous stream of log files comprising telemetry data associated with devices of the entity.

20. The non-transitory computer-readable storage medium of claim 17, the plurality of instructions further cause the processor to:

generate chunks of data of the data object to comply with token size limitations in an external application; and use the chunks of data to generate the vector embedding object.

* * * * *